KAREL KRATINA
INVENTOR.

FIG-3

KAREL KRATINA
INVENTOR.

KAREL KRATINA
INVENTOR.

United States Patent Office 3,411,488
Patented Nov. 19, 1968

3,411,488
ROTARY INTERNAL COMBUSTION ENGINE
Karel Kratina, 20 Williams St.,
Clifton, N.J. 07014
Filed Jan. 11, 1966, Ser. No. 520,007
7 Claims. (Cl. 123—16)

This invention relates to new and useful improvements in rotary internal combustion engines.

Various constructions have heretofore been proposed for internal combustion engines of the class wherein a rotatable member, connected to a shaft, is directly acted upon by the fired gases. In general, the prior constructions are highly complex, are composed of a large number of relatively movable parts, and have a low operating efficiency.

A rotary internal combustion engine made in accordance with this invention comprises a pair of rotor housings, each housing having the cross-sectional configuration of a square with rounded corners. The housings are angularly offset relative to each other, at a predetermined angle, to provide a desired combustion ratio and the housings are interconnected by a plurality of open passageways. A cylindrical rotor is disposed within each housing. These rotors are connected to a common, straight shaft concentric with the common axis of the housings and rotatable within bearings carried by the housings. Each rotor carries an equal number of radially-displaceable plungers or vanes slidably engaging the wall defining the associated housing. Novel arrangements are provided for maintaining the vanes in positive operative engagement with the associated housing wall at all times.

Each housing is divided into a plurality of operating chambers, each such operating chamber having an effective volume defined by the peripheral surface of the associated rotor, the wall of housing, and the angular position of the vanes. Upon rotation of the shaft, the volume of the operating chambers changes in a predetermined manner and sequence, thereby to provide the four operating phases of the engine, namely, fuel intake, compression, expansion and exhaust. In a more specific sense, a combustible fuel mixture is drawn into one of the housings and compressed within its operating chambers. The compressed mixture then is forced through the interconnecting passageways of the housings into associated operating chambers of the other housing for ignition and exhaust. The operating components are so constructed and arranged that in an engine having two rotors each provided with eight vanes, and utilizing four spark plugs, there are thirty two power impulses applied to the shaft per revolution, thereby providing a high operating efficiency and a high power output to weight ratio.

An object of this invention is the provision of a rotary internal combustion engine having a significantly increased operating efficiency and a high power output to weight ratio.

An object of this invention is the provision of a rotary internal combustion engine wherein the movable components are of novel construction.

An object of this invention is the provision of an internal combustion engine wherein a pair of cylindrical rotor members rotate within individual housings, each rotor member being provided with radially-displaceable vanes which define a plurality of operating chambers for effecting the intake, compression, expansion and exhaust of a combustible fuel mixture.

An object of this invention is the provision of an improved rotary internal combustion engine comprising a pair of rotor members carried by a common shaft and rotatable within individual housings, an equal number of radially-movable vanes carried by each rotor, and spark plugs carried by one of the housings; the rotors and vanes being so constructed and arranged that the number of power impulses applied to the shaft, per revolution, is the product of the number of spark plugs and the number of vanes carried by one rotor member.

An object of this invention is the provision of a rotary internal combustion engine comprising two rotor housings, which housings have cross-sectional configurations of a square with rounded corners and which housings are angularly offset to each other; a straight shaft carrying a pair of rotors, each rotor being disposed in a housing and in surface contact with diametrically-opposed portions of the housing wall, thereby generally defining four operating chambers; an equal number of radially-displaceable vanes carried by each rotor and in sliding engagement with the wall of the associated housing; and passageways interconnecting the operating chambers of the housings; the arrangement being such that, upon rotation of the shaft, fuel is drawn into and compressed within the operating chambers of one housing, and the compressed fuel is passed through the passageways into the operating chambers of the other housing for ignition by spark plugs.

An object of this invention is the provision of a rotary internal combustion engine formed of a plurality of engine units, each engine unit comprising a pair of housings angularly offset to each other, a rotor disposed within each housing and cooperating with the housing wall to form a plurality of operating chambers, an equal number of radially-displaceable vanes carried by each rotor and in slidable engagement with the housing walls, and spark plugs operatively associated with the operating chambers of one housing; all of the rotors being connected to a common shaft and each engine unit having its housings angularly offset relative to those of the other engine units.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
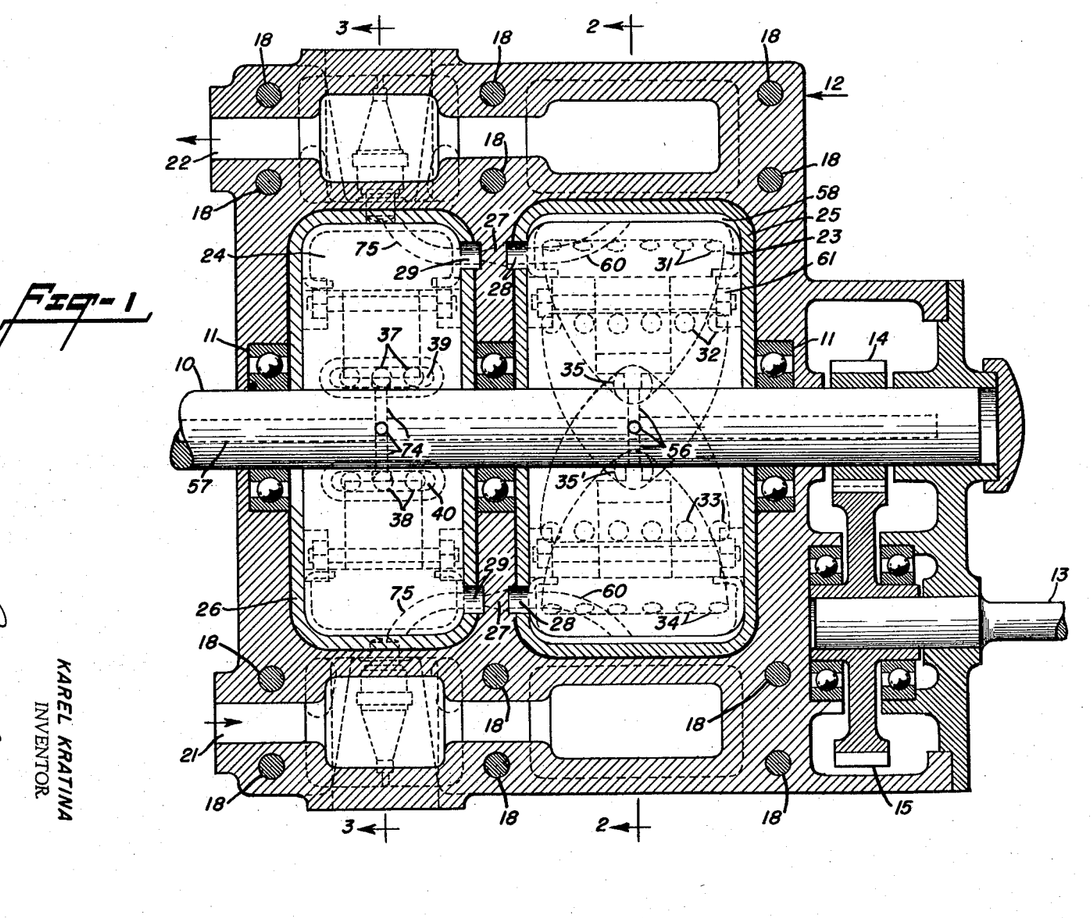
FIGURE 1 is a central, longitudinal cross-sectional view of a rotary internal combustion engine made in accordance with this invention.

Referring to FIGURE 1, a straight shaft 10 is rotatable in bearings 11 carried by the engine block 12, which shaft is mechanically-coupled to a drive shaft 13 by the gears 14 and 15. The engine block is composed of two sections, which sections are secured together by means of a plurality of bolts 18 and cooperating nuts. The engine block has formed therein interconnected passageways normally filled with water circulated from a radiator through inlet and outlet openings identified by the numerals 21 and 22, respectively. Secured to the shaft 10 are a pair of cylindrical rotors 23, 34 rotatable within the individual steel housings, 25, 26, respectively, the cross-sectional configuration of each housing, taken longitudinally of the shaft, being a square with rounded corners. Each of the housings is provided with axially-aligned holes clearing the shaft and with four arcuate openings formed in the innermost walls, that is, the walls proximate to the dividing wall of the engine block. Each of the said arcuate openings communicate with corresponding arcuate passageways formed in the dividing wall. In the particular view of FIGURE 1, there are visible two of the arcuate passageways 27 (formed in the dividing wall of the engine block), two of the associated arcuate openings 28 (formed in the housing 25), and two of the associate arcuate openings 29 (formed in the housing 26).

The housing 25 also has four sets of holes formed in the peripheral surface, each set comprising six holes identified by the numerals 31, 32, 33 and 34. As will be described hereinbelow, these holes are in communication with the fuel inlet ports of the engine. For the present, it is pointed out that the engine is provided with two inlet ports 35, 35', the port 35 flaring out and communicating with the sets of holes 31 and 33, and the port 35' flaring out and communicating with the sets of holes 32 and 34. The housing 25 constitutes the intake and compression housing, while the housing 26 constitutes the expansion and exhaust housing of the engine.

The housing 26 also has four sets of spaced holes formed in its peripheral surface, each set of these holes communicating with the exhaust ports of the engine. In the particular view of FIGURE 1, there are visible two sets of these holes identified by the numerals 37 and 38, the holes 37 being in communication with the exhaust port 39 and the holes 38 being in communication with the exhaust port 40.

Figures 2, 4:
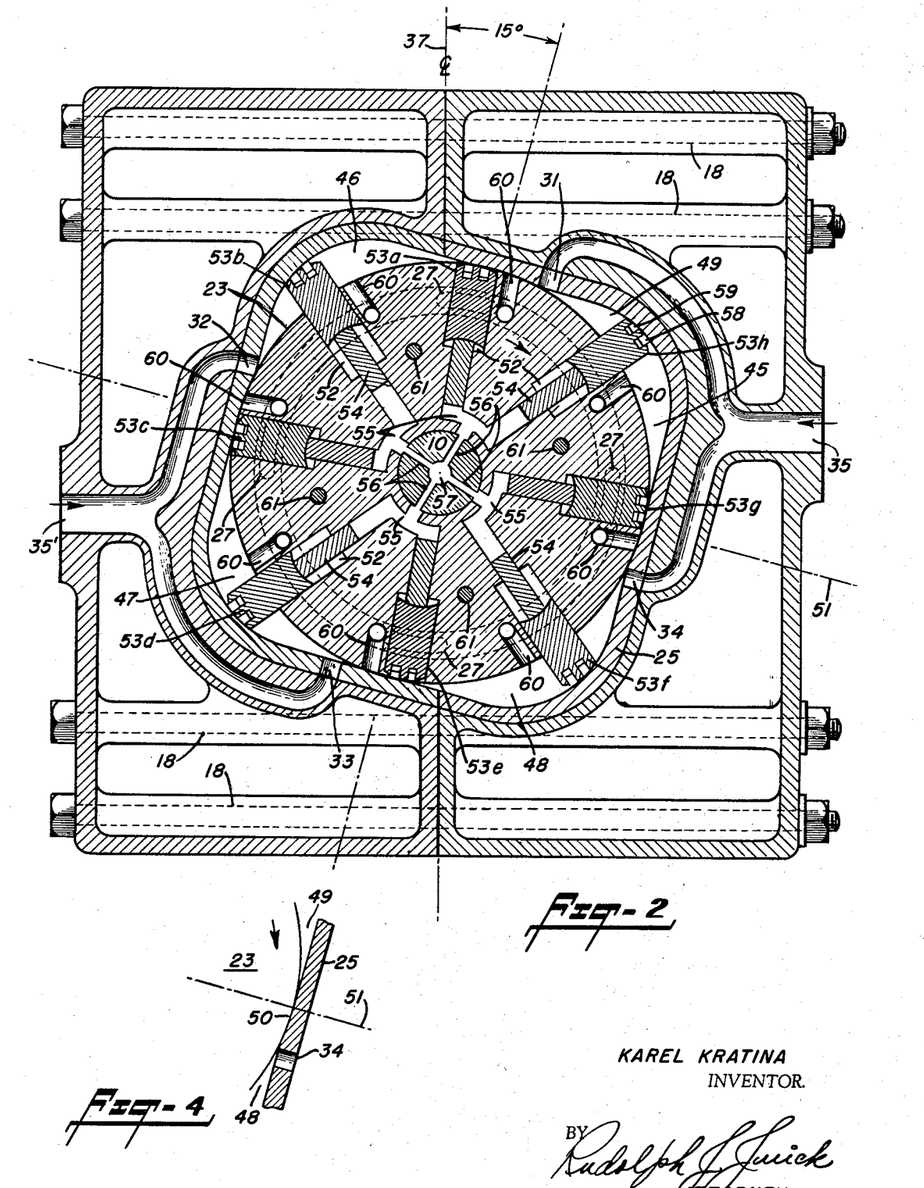
FIGURE 2 is a transverse, cross-sectional view taken along the line 2—2 of FIGURE 1.
FIGURE 4 is a fragmentary, diagrammatic representation showing the mutual surface area of contact between a rotor and the wall of the associated housing.

Reference, now, is made to FIGURE 2, which is a transverse, cross-sectional view taken along the line 2—2 of FIGURE 1. It will be noted that the configuration of the housing 25, taken along a plane normal to the shaft 10, also is a square with rounded corners. Each corner forms a quarter surface of a right cylinder. The peripheral surface of the rotor 23 engages diametrically-opposed wall portions of the housing, thereby effectively dividing the housing into four operating chambers 46, 47, 48 and 49, each operating chamber having an angular extent of somewhat less than 90 degrees. FIGURE 2 shows the two inlet ports 35, 35', each port flaring into two channels and each channel communicating with a set of the six holes formed in the peripheral surface of the housing. In this view, only one hole of each set is visible. However, it will now be apparent that each of the four operating chambers 46–48 normally in a communication with the two inlet ports through the corresponding set of six holes spaced longitudinally of the rotor.

The diametrically-opposed wall portions of the housing 25 are formed on a radius, corresponding to that of the rotor, thereby providing, in these regions, mutual surface areas of contact between the rotor and housing, rather than line contacts. This construction will more clearly be understood by reference to the fragmentary, line representation of FIGURE 4. The arcuate, mutual surface area of contact between the rotor 23 and the wall of the housing 25 is identified by the numeral 50 and has an angular extent of 12 degrees. It will be noted that the rotor surface comes into engagement with the housing wall along a line falling on the median plane 51 of the housing, thereby defining the end of the operating chamber 49, and that the rotor surface leaves the housing wall along a line just ahead of the inlet hole 34, thereby defining the beginning of the operating chamber 48. The four mutual surface areas of contact between the rotor and the housing provide effective seals between the four operating chambers.

Referring again to FIGURE 2, the housing 25 is shown offset at an angle of 15 degrees, clockwise, from the vertical center 37 line of the engine, for a purpose to be explained below. The rotor 23 is provided with eight radially-extending slots 52. Disposed within such slots are eight plungers or vanes 53a–53h. These slots 52 terminate in slots of reduced cross-sectional area which accommodate eight vane lifters 54. Adjacent ones of the latter slots are in communication with arcuate openings 55, formed in the rotor and each such opening communicates with one of the radial holes 56 formed in the shaft 10. These four radial holes terminate in a central hole 57 formed in the shaft, see also FIGURE 1. Each of the eight vanes carries a pair of sealing bands such as the bands identified by the numerals 58 and 59 and carried by the vane 53h.

Figure 5:
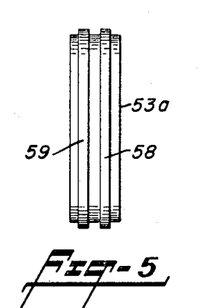
FIGURE 5 is a top plan view of one of the vanes and associated sealing bands.
Figure 6:
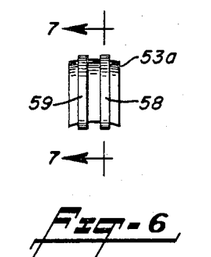
FIGURE 6 is an end elevational view thereof.
Figure 7:
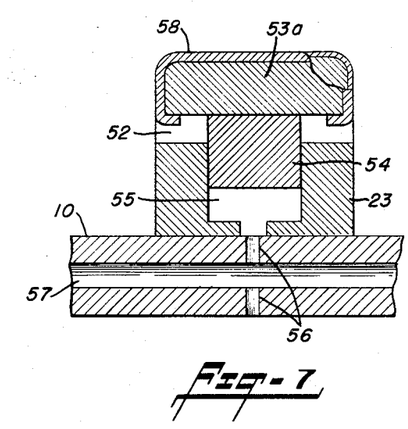
FIGURE 7 is a cross-sectional view taken along the line 7—7 of FIGURE 6 and including the rotor shaft and associated vane lifter.

The shape and construction of the vanes is shown in FIGURES 5–7 to which reference now is made. The vane 53a is of generally rectangular cross-section with a convex top surface and a concave bottom surface. A pair of parallel grooves are formed in the top and end walls. The steel sealing bands 58 and 59 have widths slightly less than that of the grooves and have their ends offset inwardly along the bottom wall of the vane. These sealing bands are formed to correspond with the contour of the housing (see also FIGURE 1) and are arranged to have a limited amount of movement into and out of the grooves. For purposes of understanding, the cross-sectional view, FIGURE 7, includes the associated vane lifter 54, and portions of the rotor 23 and shaft 10. The vane 53a is radially-displaceable within the radial slot 52, formed in the rotor, and the vane lifter is movable within the reduced cross-sectional area slot communicating with the arcuate rotor slot 55, said slot 55 being in communication with the central shaft hole 57 through one of the radial holes 56.

Referring again to FIGURE 2, the central shaft hole 57, the radially-extending shaft holes 56, the arcuate rotor openings 55 and the slots housing the vane lifters 54 are filled with oil, after which the entrance opening of the shaft hole 57 is closed by means of a suitable plug. In such closed, hydraulic system, the vane lifters operate automatically to maintain the sealing bands of the vanes in firm engagement with the inner wall of the housing 25 during rotation of the rotor. Specifically, the vane 53h occupies a position wherein it is extended outwardly of the rotor to a maximum extent, whereas the following vane 53a occupies a position where it is depressed to a maximum extent within the rotor slot. Now, upon clockwise rotation of the rotor, the housing wall will force the vane 53h to move inwardly of the slot thereby developing a pressure on the oil. This pressure forces the vane 53a to move outwardly of its slot. The shape of the inner wall of the operating chamber 49 and the spacing of these paired vanes is such that a given inward movement of the vane 53h corresponds precisely to the necessary outward movement of the vane 53a. All of the paired vanes operate in the same manner. Thus, the sealing bands are maintained in pressure contact with the inner peripheral walls of the housing at all times.

Formed in the rotor 23 are eight curved passageways 60, each passageway extending from the peripheral surface of the rotor to one rotor face, see also FIGURE 1. The entrance openings of these curved passageways are, at all times, open to the operating chambers. On the other hand, the exit openings of these curved passageways are closed by the side walls of the housing at all times, except when such exit openings come into alignment with the four arcuate passageways 27 formed in the dividing wall of the engine block, see also FIGURE 1. As will be described in detail hereinbelow, during rotor rotation, fuel is drawn into and compressed within the four operating chambers and the compressed fuel is transferred into the operating chambers of the other housing through the arcuate passageways 27. It may here be pointed out that the rotor 23 is made of two or more sections secured together by four bolts 61 and cooperating nuts (see also FIGURE 1), thereby to facilitate the formation of the numerous openings and passageways.

Figure 3:
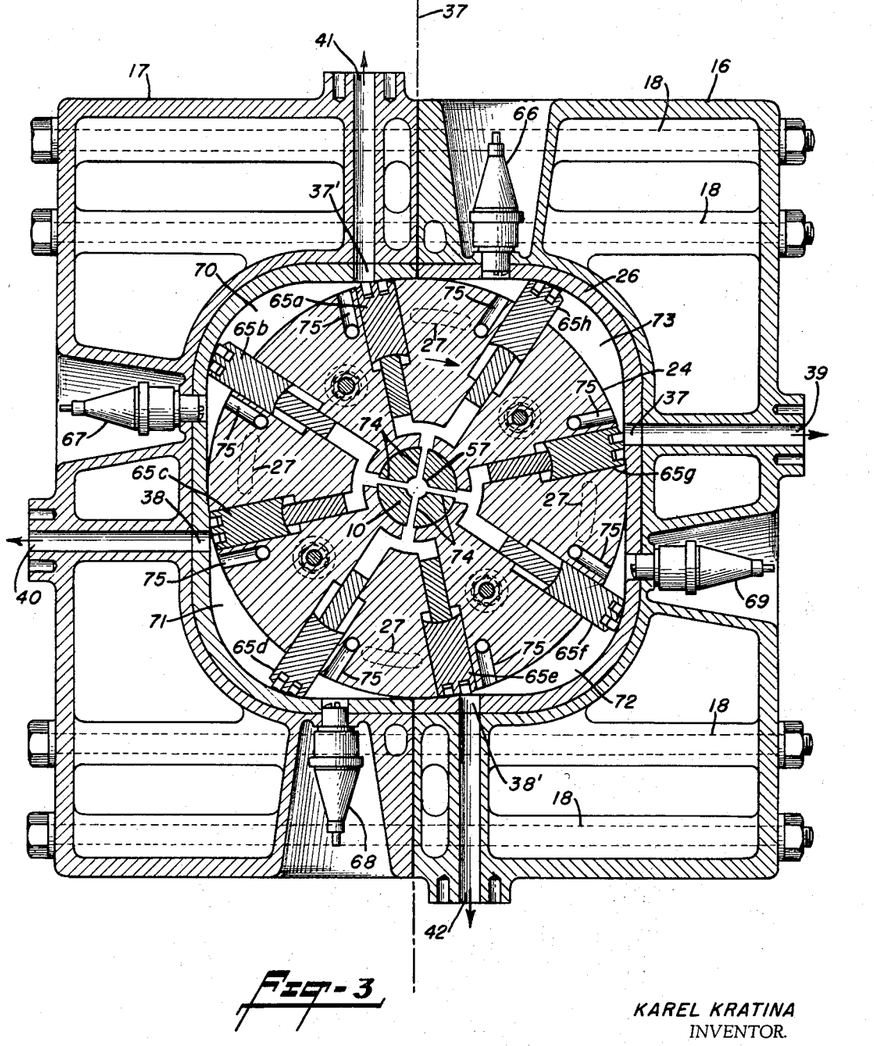
FIGURE 3 is a similar view taken along the line 3—3 of FIGURE 1.

The expansion and exhaust of the fuel takes place in the housing 26. Referring to FIGURE 3, which is a transverse, cross-sectional view taken along the line 3—3 of FIGURE 1, the housing 26, rotor 24 and the vanes 65a–65h, are constructed and arranged similar to the intake-compression components already described. In this case, however, the housing 25 is positioned to be geometrically symmetrical with respect to the vertical center line 37 of the engine and spark plugs 66–69 are operatively associated with the four operating chambers 70–73. The central shaft hole 57 extends past the rotor 24 and is intersected by the four radial holes 74, see also FIGURE 1, whereby the vanes operate in the same manner as the vanes carried by the other rotor. Eight curved passageways 75 are formed in the rotor 24, each passageway extending from the peripheral surface of the rotor to one rotor face. Whereas, the similar passageways formed in the rotor 23 are positioned ahead of the vanes, the passageways 75 are positioned in back of the vanes. For reference purposes, the four arcuate passageways 27, formed in the dividing wall of the engine block, are shown in FIGURE 3. Those ends of the curved rotor passageways 75 which intersect the peripheral surface of the rotor are at all times open to the operating chambers, whereas the other ends of such passageways are closed by the side walls of the housing except when such ends come into alignment with the arcuate passageways 27.

Visible in FIGURE 3 are one each of the four sets of holes which communicate with the exhaust ports of the engine, such holes being identified by the numerals 37, 37′, 38 and 38′. Each set of these holes extends longitudinally of the rotor and communicates with the associated exhaust ports 39, 41, 40 and 42. FIGURE 3 also shows the two sections 16 and 17 of the engine block, which sections are secured together by the bolts 18 and cooperating nuts.

The four operating cycles of the engine will now be described with reference to the diagrammatic representations of FIGURE 8–12.

Figure 8:
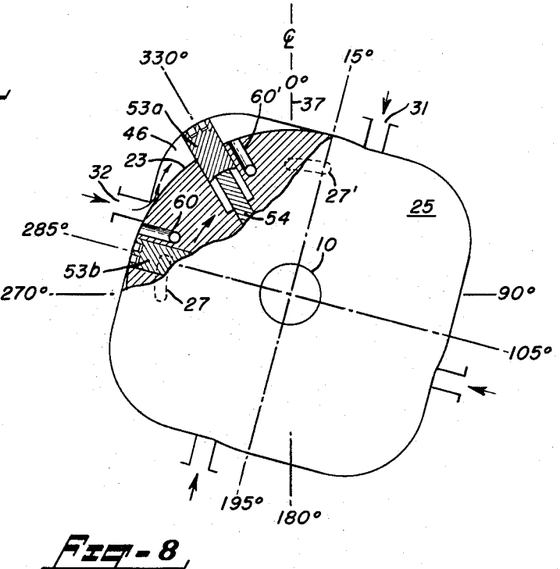
FIGURES 8–12 are diagrammatic representations to illustrate the operating cycles of the engine.
Figures 9, 10, 11:
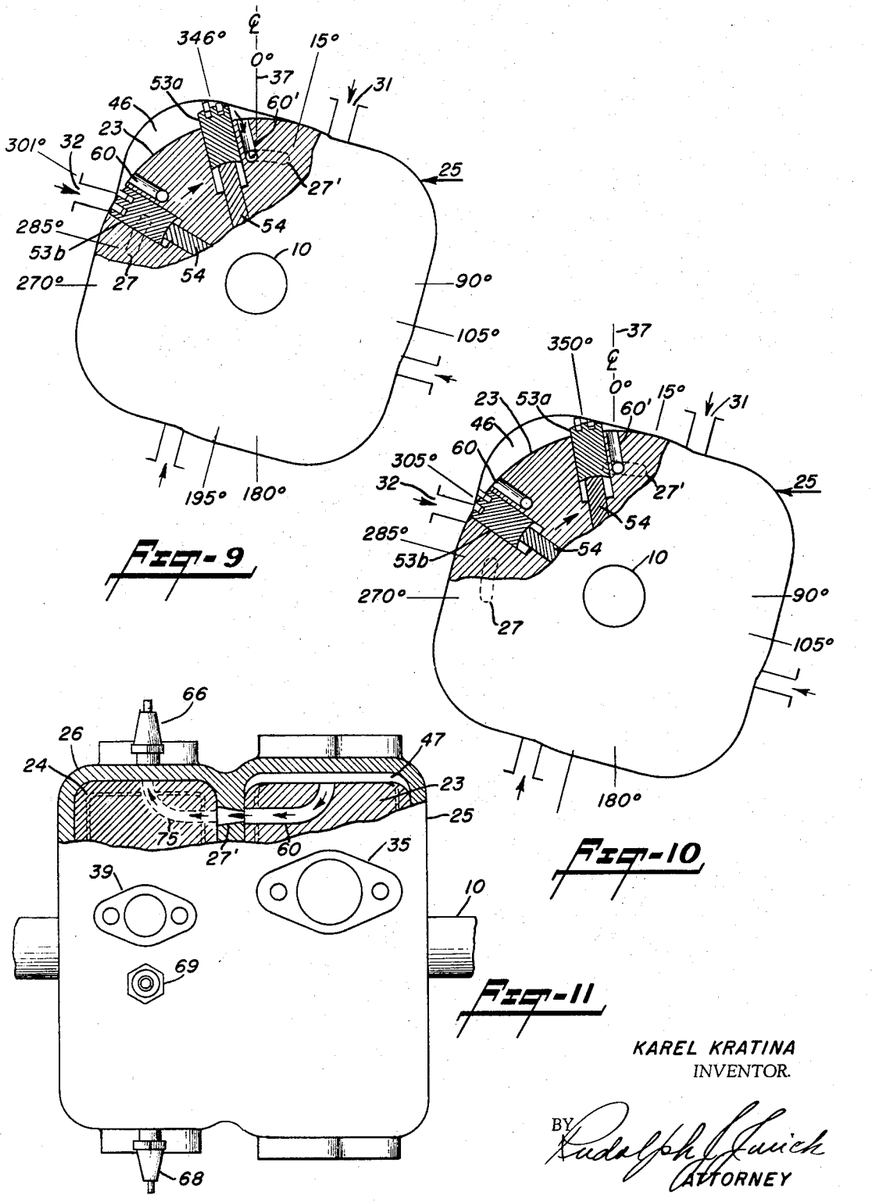

The related FIGURES 8, 9 and 10 show the intake-compression housing 25, (offset 15 degrees clockwise relative to the engine center line 37), the shaft 10, the rotor 23, two adjacent inlet ports identified by the numerals 31 and 32, and two adjacent vanes 53a and 53b. Also shown are two of the curved passageways formed in the rotor, said passageways being here identified by the numerals 60 and 60′ for purposes of description. Likewise, the two arcuate passageways formed in the dividing wall of the engine block are here identified by the numerals 27 and 27′. The latter passageways will hereinafter be referred to as transfer passageways, since it is through these passageways that the fuel mixture is transferred from the four operating chambers of the intake-compression housing to the corresponding operating chambers of the expansion-exhaust housing, at the proper time in the engine operating cycle.

As has been described hereinabove, the peripheral surface of the rotor 23 engages diametrically-opposed wall portions of the housing 25 at surface areas of contact lying just ahead of the intake openings. Thus, when the rotor is in the position shown in FIGURE 8, the inlet port is open to the operating chamber 46, and the vanes 53a and 53b are positioned on opposite sides of such port. Upon clockwise rotation of the rotor, the fuel mixture is drawn into the operating chamber. As the vanes, which are passed apart 45 degrees, rotate 16 degrees to the positions shown in FIGURE 9, the fuel mixture continues to be drawn into the operating chamber. Now, as the vanes are rotated an additional 4 degrees, to the positions shown in FIGURE 10, the vane 53b has passed beyond the inlet port 32 so that the indrawn fuel mixture now is contained within the central portion of the operating chamber 46, such central portion being defined by the spaced walls of the rotor and the housing, the right side of the vane 53b and the left side of the vane 53a. The volume of the contained fuel mixture, at this point in the operating cycle, is a maximum, say, 5 cubic inches. Upon continued rotation of the rotor, the effective volume of this central portion of the operating chamber is decreased thereby compressing the contained fuel mixture. Just prior to the time that the arcuate rotor passageway 60 comes into initial alignment with the arcuate transfer passageway 27′, the effective volume of the chamber has decreased a minimum value, say, .75 cubic inch, thereby providing a 7 to 1 compression ratio. At the moment that the rotor passageway 60 comes into alignment with the transfer passageway, the compressed fuel mixture is passed through the transfer passageway and into a corresponding operating chamber of the expansion-exhaust housing 26 (see also FIGURE 11), through the curved passageway 75 formed in the other rotor 24. Such fuel transfer takes place during the entire time that the curved passageways of the two rotors are in alignment with the common transfer passageway 27′.

During rotor rotation, as the leading vane is pressed inwardly of the rotor, due to the contour of the housing, the resulting pressure upon the oil forces the following vane outwardly of the housing. Such opposite vane displacements are at all times equal, whereby the sealing bands carried by the vanes are maintained in firm, sliding engagement with the housing walls. The effective volume of the operating chamber increases from a minimum to a maximum value as fuel is drawn into the chamber and then decreases to a minimum value as the fuel mixture is compressed and transferred into the corresponding operating chamber of the other housing. With specific reference to FIGURE 10, it will be noted that the transfer passageway has an arcuate extent of 15 degrees, whereby the transfer of the compressed fuel mixture occurs throughout a 15 degree rotation of the rotor. It will now be clear that the fuel mixture is drawn into the operating chamber, compressed therein and then transferred to the other housing, each time a single vane sweeps through the operating chamber. With eight vanes carried by the rotor, eight such intake-compression cycles occur during each revolution of the rotor. Since the ignition of the fuel mixture takes place in the other housing, the operating chambers of the housing 25 remain cool, thereby resulting in a maximum fuel intake during each operating cycle of the engine.

Figures 12, 13A, 13B, 13C, 13D:
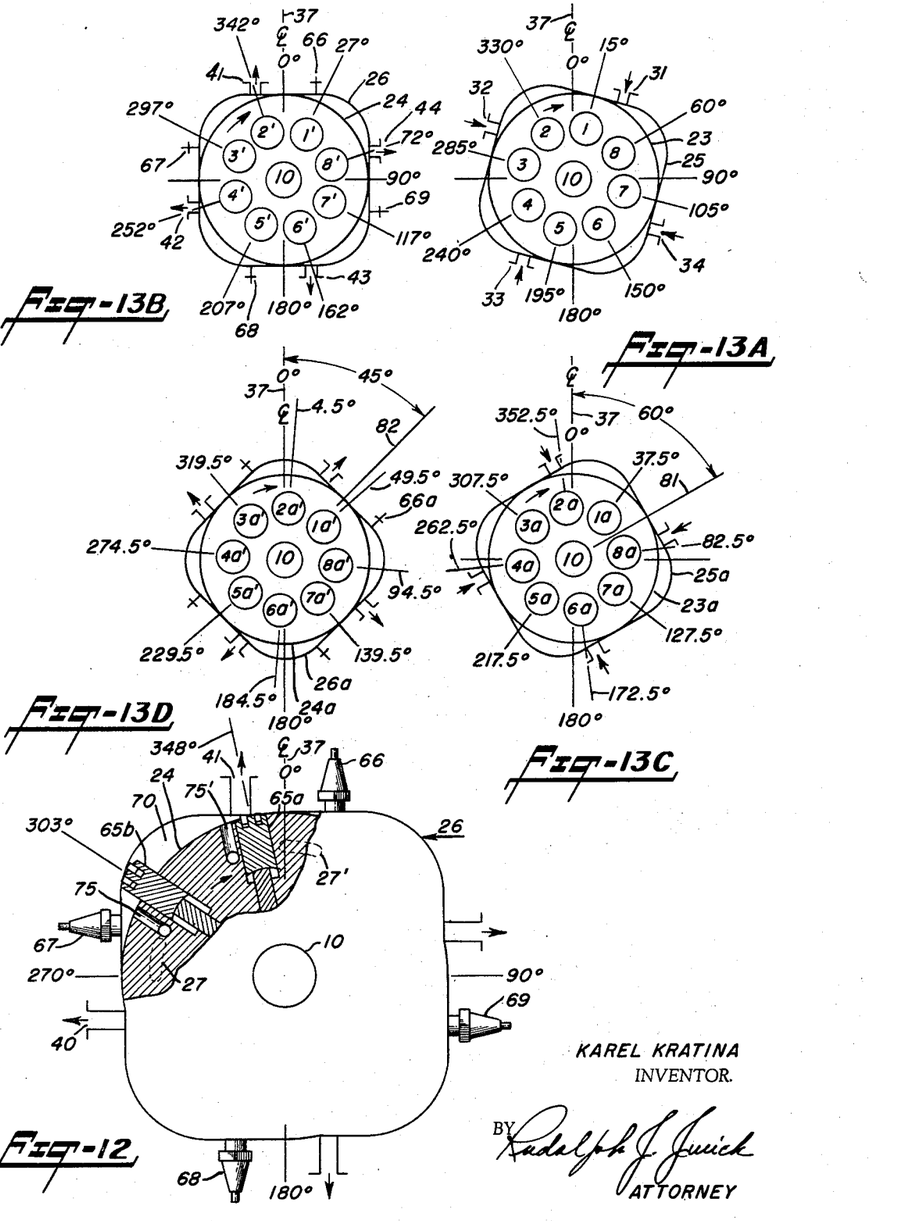
FIGURES 13A–D are diagrammatic representations to illustrate a series arrangement of two engine units to provide an increased power output.

The expansion-exhaust housing 26 is shown in the diagrammatic representation of FIGURE 12. This housing is symmetrical, with respect to the center line 37 of the engine, that is, the housing is offset 15 degrees counterclockwise relative to the intake-compression housing. Hence, the transfer passageways 27, 27′ lie predominantly to the right of the vertical and horizontal center lines of the housing 26. The two adjacent curved passageways formed in the rotor 24 are identified by the numerals 75 and 75′. In this case, the leading end of the operating chamber 70 is defined by the mutual surface area of contact between the rotor and the housing wall, whereas the other end of the chamber is open to the exhaust port 41. The compressed fuel is transferred into that portion of the operating chamber lying to the left of the vane 65b during the time period that the rotor passageway 75 is in alignment with the transfer passageway 27. The fuel transfer is completed when the passageway 75 passes out of alignment with the transfer passageway 27. It is here pointed out that the effective volume of the chamber 70 (that is, that portion of the chamber lying to the left of the vane 65b), is zero when the rotor passageway 75 first comes into alignment with the transfer passageway 27, and that such effective volume increases to .75 cubic inch when the rotor passageway passes out of alignment with the transfer passageway. Since the compressed fuel mixture (contained within the corresponding operating chamber of the intake-compression housing) has a volume of .75 cubic inch just prior to the transfer of the mixture into the expansion-exhaust chamber 70, the compression ratio of 7:1 is maintained during the complete transfer of the fuel mixture from one housing to the other. More specifically, during the period when the fuel mixture is transferred, the effective volume of the receiving chamber increases at the same rate that the delivery chamber decreases. Actually, during start-up of the engine, there is a slight drop in the compression ratio due to the filling of the transfer passageway. Thereafter, the transfer passageway remains filled with the compressed fuel mixture. The moment that the rotor passageway 75 has passed out of alignment with the transfer passageway 27, the spark plug 67 fires, whereby the vane 65b is driven in a clockwise direction. Simultaneously, the right side of the vane 65b drives the residue gases from the previous expansion cycle out of the exhaust port 41. Thus, an expansion and exhaust cycle takes place in the operating chamber each time a vane sweeps through the chamber, that is, eight times during one revolution of the rotor.

In summary, in the described engine having four operating chambers formed in each of the housings, fuel is simultaneously drawn into and compressed within each of the four operating chambers of the intake-compression housing as a vane sweeps through such operating chambers. The compressed fuel mixtures are simultaneously transferred from each of such operating chambers into the corresponding four operating chambers of the expansion-exhaust housing. The expansion and exhaust cycle occurs simultaneously in the four operating chambers of the expansion-exhaust housing each time a vane sweeps through such chambers. Since eight complete operating cycles of the engine occur during one revolution of the rotors, there are thirty-two power impulses applied to the common shaft, per revolution.

A rotary internal combustion engine made in accordance with this invention is not limited to the illustrated construction having four operating chambers formed in each of the housings. These housings may have other polygonal configurations to provide a desired number of operating chambers within each housing. In such case, each rotor will be provided with an appropriate number of vanes, thereby to provide other than thirty-two power impulses per shaft revolution. In each case, the number of such power impulses is equal to the number of operating chambers formed in one housing multiplied by the number of vanes carried by the rotor.

The basic engine unit comprises two housings offset at an angle to each other, which angle may be other than the described 15 degrees, thereby to provide a desired engine compression ratio. In the described construction, and with reference to FIGURE 3, the eight rotor vanes are spaced apart 45 degrees. The mutual surface area of contact between the peripheral surface of the rotor and the housing wall is 12 degrees, each exhaust outlet opening has an angular extent of 6 degrees and each vane rotates 45 degrees from the point at which the spark plugs fire to the point where the spent gases are completely exhausted. Since there are four operating chambers, each vane must rotate 90 degrees during each expansion and exhaust cycle. More specifically, when the spark plug 67 fires, the vane 65b is driven in a clockwise direction. As this vane rotates to the position of the preceding vane 65a, it drives the spent gases from the previous ignition cycle out of the exhaust port 41. Now, as the vane 65b rotates to the position of the vane 65b, it performs no work. Thus, throughout each expansion and exhaust cycle, there is a workless zone of some 45 degrees. Such workless zone may be eliminated by arranging two or more of the described engine units in series relation, with all of the rotors connected to a common shaft, thereby resulting in an increased power output. In such multiple engine unit, all units may be disposed within a common engine block, or, alternatively, each unit may be disposed within its individual engine block. In any event, each engine unit will be angularly offset relative to each of the other units by a desired amount.

Reference now is made to the diagrammatic representations of FIGURES 13A–D, which show the angular orientation of the housings for a two unit engine. FIGURE 13A shows the intake-compression housing 25 of one engine unit, the rotor 23 and the four inlet ports 31–34. In this figure, the momentary positions of the eight rotor vanes are identified by the radial lines extending from the encircled numerals 1 through 8. This housing is offset, clockwise, 15 degrees from the vertical center line 37 of the engine and the angular position of each vane is given by the extended radial lines marked in degrees, taken clockwise from the vertical center line of the engine. The associated expansion-exhaust housing 26 and its rotor 24 are shown in FIGURE 13B. This housing carries the spark plugs 66–69 and has the four exhaust ports 41–44. The corresponding momentary positions of the eight rotor vanes are shown by the radial lines extending from the encircled numerals 1′ through 8′, it being noted that the vertical center line of this housing coincides with the vertical center line of the engine.

FIGURE 13C shows the intake compression housing 25a of the second engine unit, with the corresponding momentary position of the vanes, carried by the rotor 23a, identified by the radial lines extending from the encircled reference characters 1a through 8a. It will be noted that the vertical center line of this housing is positioned at an angle of 60 degrees, clockwise, with reference to the vertical center line 37 of the engine. Thus, the positions of the inlet ports and the corresponding momentary positions of the vanes, are advanced 22.5 degrees ahead of those of the similar housing 25 of the other engine unit. FIGURE 13D shows the expansion-exhaust housing 26a which is associated with the intake-compression housing 25a. As is the case of the first engine unit, the second engine unit housing 26a is offset 15 degrees, counterclockwise, relative to its associated housing 25a. Specifically, the vertical center line 82 of the expansion-exhaust housing 26a is advanced 45 degrees from the vertical center line 37 of the engine. Thus, the corresponding momentary positions of the eight vanes of the rotor 24a are identified by the radial lines extending from the encircled reference characters 1a′ through 8a′.

The four rotors of the two unit engines are connected to the common shaft 10, which shaft extends through all four of the housings and along the common axis thereof. The four spark plugs of the first engine unit, see FIGURE 13B, fire simultaneously eight times during one revolution of the shaft. Such firing occurs when the vanes of the rotor 24 are in the illustrated positions, the resulting explosive forces acting upon the vanes 1′, 7′, 5′ and 3′. The next firing cycle occurs after the rotor has rotated 45 degrees, so that the explosive forces act upon the vanes 2′, 8′, 6′ and 4′. The following tabulation shows the set of four vanes acted upon during each firing cycle for one complete revolution of the rotor.

FIRST ENGINE UNIT

| | Angular Positions of Vanes When Spark Plugs Fire | | | |
|---|---|---|---|---|
| | 27° | 117° | 207° | 297° |
| Sets of Vanes Acted Upon During Each Firing of Spark Plugs For One Revolution of Rotor. | 1′ | 7′ | 5′ | 3′ |
| | 2′ | 8′ | 6′ | 4′ |
| | 3′ | 1′ | 7′ | 5′ |
| | 4′ | 2′ | 8′ | 6′ |
| | 5′ | 3′ | 1′ | 7′ |
| | 6′ | 4′ | 2′ | 8′ |
| | 7′ | 5′ | 3′ | 1′ |
| | 8′ | 6′ | 4′ | 2′ |

Similarly, the four spark plugs of the second engine unit, see FIGURE 13D, fire simultaneously eight times during one revolution of the shaft. However, these spark plugs fire when the common engine shaft has been rotated 45 degrees. Specifically, at the moment that the spark plugs of the first engine unit fire (see FIGURE 13B) the vanes of the second engine unit occupy the angular positions shown in FIGURE 13D.

It will be noted that although each spark plug fires eight times during one shaft revolution, a given vane is acted upon only four times during this period. For example, when the vane 1' occupies the 27° position as shown in FIGURE 13B, it is acted upon by the fuel mixture ignited by the spark plug 66. During rotation of this vane to the 72° position, it forces the residue gases from the previous firing of the spark plug out of the exhaust port 44. When the vane 1' is in the 72° position, it has completed its work function and the following vane 2' occupies the 27° position, at which time the spark plug 66 again fires. This results in rotation of the vane 1' to the 117° position where it is then acted upon by the fuel mixture ignited by the spark plug 69. During this 45 degree rotation of the vane 1' (from the 72° to the 117° position) it performs no work function.

The expansion-exhaust housing 26a, of the second engine unit, is angularly offset by 45 degrees relative to the corresponding housing 26 of the first engine unit. The two rotors are of identical construction with the vanes of each rotor spaced apart by an angle of 45 degrees. However, when considered with reference to the common shaft, the vanes of the respective rotors have an effective angular spacing of 22.5 degrees. For example, when the vane 1' of the rotor 24 is in the illustrated 27° position, the corresponding vane 1a' of the rotor 24a is in the illustrated 49.5° position. The four spark plugs of the expansion-compression housing 26a fire simultaneously eight times during one revolution of the shaft. However, the two sets of spark plugs are timed to fire alternately at spaced time intervals corresponding to a 22.5 degree rotation of the shaft. For example, the spark plug 66 (FIGURE 13B) fires for the first time when the vane 1' is in the 27° position with reference to the engine center line 37, at which moment the corresponding vane 1a' (FIGURE 13D) is in the illustrated 49.5° position. When the shaft rotates 22.5 degrees, the vane 1a' will occupy a position of 72 degrees, (49.5°+22.5°), with reference to the vertical center line of the engine. When the vane 1a' is in this position, the spark plug 66a fires for the first time. Upon a further rotation of the shaft by 22.5 degrees, the spark plug 66 fires for the second time, at which moment the vane 2' occupies the illustrated position of vane 1'. Upon a further 22.5 degree rotation of the shaft, the spark plug 66a fires the second time, at which moment the vane 2a' occupies a position of 72° measured from the vertical center line of the engine.

It will be apparent, therefore, that the vanes 1a', 7a', 5a' and 3a', of the rotor 24a will respectively occupy positions of 72°, 162°, 252°, and 342°, clockwise of the vertical center line of the engine, when the four spark plugs of the housing 26a fire for the first time. During the second firing of these spark plugs, the next following vanes 2a', 8a', 6a' and 3a' will occupy the firing positions. The following tabulation shows the set of four vanes acted upon during each firing cycle of the second engine unit.

SECOND ENGINE UNIT

|  | Angular Positions of Vanes When Spark Plugs Fire | | | |
| --- | --- | --- | --- | --- |
|  | 72° | 162° | 252° | 342° |
| Sets of Vanes Acted Upon During Each Firing of Spark Plugs For One Revolution of Rotor. | 1a' | 7a' | 5a' | 3a' |
|  | 2a' | 8a' | 6a' | 4a' |
|  | 3a' | 1a' | 7a' | 5a' |
|  | 4a' | 2a' | 8a' | 6a' |
|  | 5a' | 3a' | 1a' | 7a' |
|  | 6a' | 4a' | 2a' | 8a' |
|  | 7a' | 5a' | 3a' | 1a' |
|  | 8a' | 6a' | 4a' | 2a' |

In the described two unit arrangement, the workless zone of the engine is eliminated and sixty four power impulses are applied to the shaft during each revolution. Inasmuch as each engine unit operates independently, except for the connection of all of the rotors to a common shaft, it will be apparent that a plurality of engine units can be arranged back-to-back with all of the rotors connected to a common shaft, thereby increasing the number of power impulses applied to the shaft. For example, a multiple engine made up of ten units, made as described, would have each engine unit progressively offset from the engine center line by 9 degrees, and will result in 320 power impulses applied to the shaft, per revolution.

Having now described the invention, those skilled in this art will be able to make various changes and modifications without thereby departing from the scope and spirit of the invention as recited in the following claims.

I claim:

1. A rotary internal combustion engine unit comprising,
   (a) an engine block carrying axially aligned bearings and having a dividing wall,
   (b) first and second similarly-shaped closed housings disposed on opposite sides of said dividing wall, each housing having an internal surface defined by straight side walls and rounded corners and said housings being angularly offset relative to each other about the common axis of said bearings,
   (c) a shaft having a central bore formed therein and rotatably supported by said bearings, said shaft extending through axially-aligned holes formed in both housings and the said dividing wall,
   (d) first and second cylindrical rotors disposed respectively within said first and second housings and secured to the shaft, each rotor having its peripheral surface in sliding engagement with the inner straight side walls of the associated housing thereby defining operating chambers corresponding in number to the rounded housing corners,
   (e) means forming arcuate-shaped, aligned fuel transfer passageways in the said dividing wall and the proximate end walls of the two housings,
   (f) means forming a plurality of radial slots of rectangular cross-section in each rotor,
   (g) means forming radial holes in said shaft, which holes communicate with said central bore and said radial slots,
   (h) a vane lifter of rectangular cross-section disposed within each of said radial slots,
   (i) a vane of rectangular cross-section positioned within each of said radial slots, each vane having an inner end engageable by the associated vane lifter,
   (j) a sealing band carried by each vane, which sealing bands conform to the contour of the operating chambers,
   (k) a liquid filling the said central bore, radial holes and radial slots to maintain the sealing bands in engagement with the inner walls of the housings during rotation of the shaft,
   (l) fuel inlet ports formed in the wall of the first housing, each inlet port communicating with one of the operating chambers of such housing,
   (m) exhaust ports formed in the wall of the second housing, each exhaust port communicating with one of the operating chambers of such housing,
   (n) spark plugs operatively associated with the operating chambers of the second housing, and
   (o) arcuate passageways formed in each rotor in such manner that upon normal rotation of the shaft the arcuate passageways formed in the first rotor alternately communicate with the operating chambers of the first housing and the said fuel transfer passageways and the arcuate passageways formed in the second rotor alternately communicate with the fuel transfer passageways and the operating chambers of the second housing.

2. The invention as recited in claim 1, wherein the two housings have a configuration, taken normal to the shaft axis, of a square with the corners forming a quarter surface of a right cylinder.

3. The invention as recited in claim 1, wherein the number of vanes carried by each rotor is twice the number of operating chambers of each housing.

4. The invention as recited in claim 1, wherein the regions of contact between the peripheral surface of the rotor and the inner wall of the associated housing is a curved surface area having a radius corresponding to that of the rotors.

5. The invention as recited in claim 4, wherein the curved surface areas of the first housing are positioned before the fuel inlet ports, and wherein the curved surface areas of contact of the second housing are positioned behind the exhaust ports, both positions being taken with reference to the normal direction of shaft rotation.

6. The invention as recited in claim 1, in combination with a second engine unit of identical construction, the two engine units being angularly offset to each other by a predetermined angle and all of the rotors being connected to the said shaft.

7. The invention as recited in claim 1, wherein the volumes of the operating chambers of the first housing decrease at a rate equal to the increase of the volumes of the operating chambers of the second housing when the arcuate passageways of the two rotors are in alignment with the fuel transfer passageways, such changes in volume being effected by the vanes of the rotors sweeping through the operating chambers upon rotation of the shaft.

References Cited

UNITED STATES PATENTS

| | | |
|---|---|---|
| 18,986 | 12/1857 | Palmer. |
| 735,943 | 8/1903 | Chardonnet. |
| 1,249,881 | 12/1917 | Anglada _____________ 123—16 |
| 2,075,561 | 3/1937 | Wellensiek __________ 123—16 |

RALPH D. BLAKESLEE, *Primary Examiner.*